United States Patent [19]

Eberle et al.

[11] Patent Number: 5,249,727
[45] Date of Patent: Oct. 5, 1993

[54] WELD PENETRATION DEPTH INSPECTION

[75] Inventors: Jack G. Eberle; Richard B. Ringler, both of Palm Beach Gardens, Fla.

[73] Assignee: United Technologies Corporation, Hartford, Conn.

[21] Appl. No.: 994,373

[22] Filed: Dec. 21, 1992

[51] Int. Cl.⁵ .............................................. B23K 15/00
[52] U.S. Cl. ...................... 228/104; 228/119; 228/56.5
[58] Field of Search ............. 228/103, 104, 119, 56.5; 29/402.13, 402.16

[56] References Cited

U.S. PATENT DOCUMENTS 3,436,515  4/1969  Sayer et al.
4,893,944  1/1990  Leroux .................................. 374/46

FOREIGN PATENT DOCUMENTS 58-179577  4/1982  Japan .
0747662  7/1980  U.S.S.R. ............................... 228/103

Primary Examiner—Samuel M. Heinrich
Attorney, Agent, or Firm—Charles E. Sohl

[57] ABSTRACT

A method for inspecting a repair insert welded into a hole where the weld is not permitted to penetrate the full depth of the hole. An inspection feature, either grooves at the minimum and maximum weld depths or grooves parallel to the insert axis, is formed on the surface of the repair insert. The insert is welded into the hole using electron beam or laser welding. The structure is then non-destructively inspected to determine whether the inspection feature has been consumed at the minimum required weld depth and has not been consumed at the maximum permitted weld depth.

12 Claims, 2 Drawing Sheets

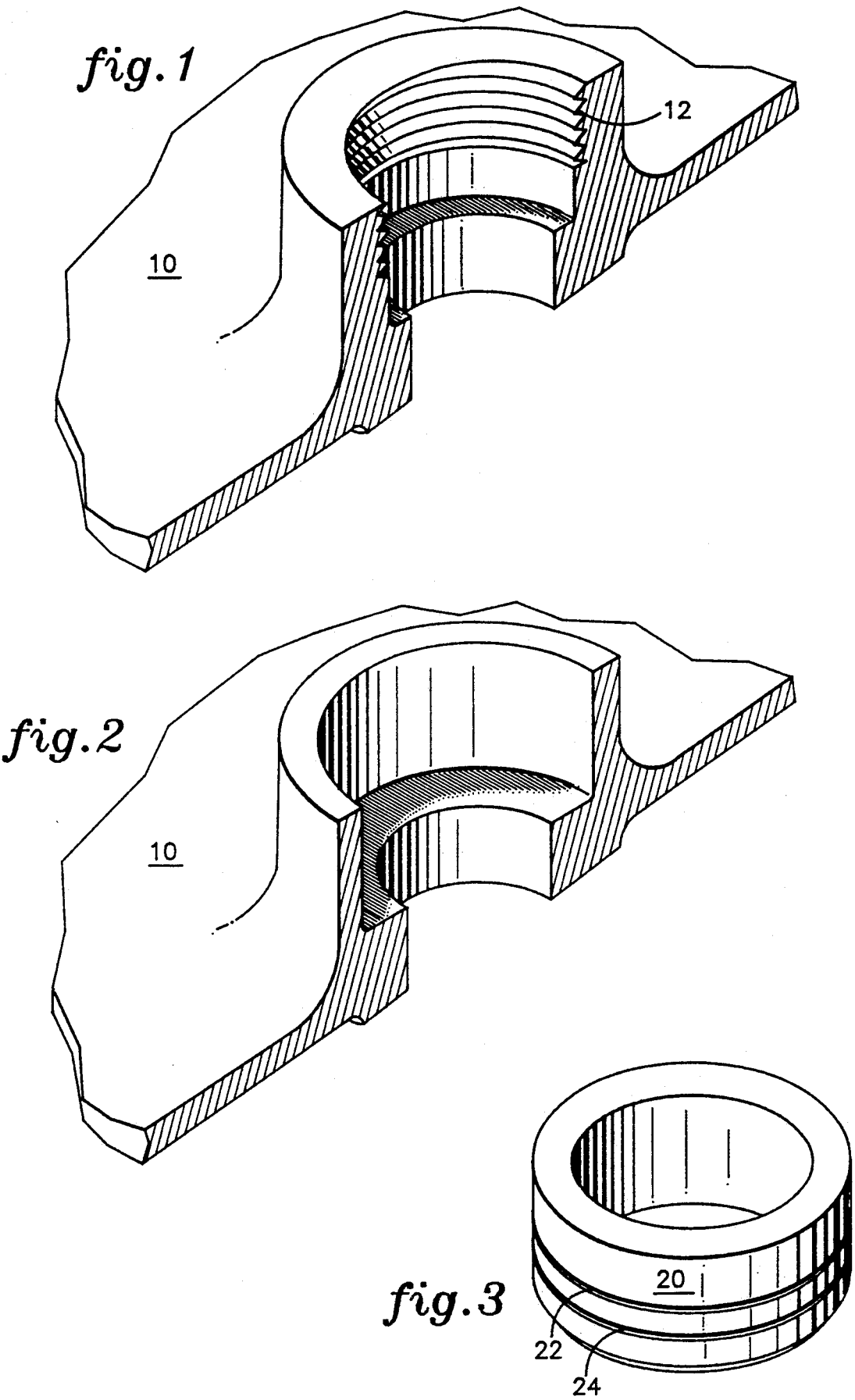

WELD PENETRATION DEPTH INSPECTION

The Government has rights in this invention, pursuant to a Contract awarded by the Department of the Air Force.

TECHNICAL FIELD

This invention deals with the non-destructive inspection of depth of penetration of welds, and more particularly to the non-destructive inspection of welded joints wherein the depth of the weld is restricted.

BACKGROUND ART

Fusion welding of two metal parts involves applying a high energy heat source in a restricted region in the area where the two parts are to be welded. This results in the melting of a thin layer of metal on the surface of each part. The melted portions of each part mix together and, upon cooling, solidify and form the weld joint which fastens the two parts together.

In the welding of certain parts, the weld region must be restricted, and the penetration of the weld must be controlled. While limitations placed on the welding operation can generally control the depth of the weld effectively, many applications require a post weld inspection to verify the extent of the penetration of the weld. To avoid damage to, and subsequent loss of, the part, nondestructive inspection methods have been developed. These include, for example, ultrasonic and x-ray inspection techniques.

An example of an application where the depth of penetration of the weld must be controlled involves the repair of an ignitor boss on a gas turbine engine diffuser case. Repair is necessary if, for example, the ignitor boss has been damaged during manufacture or has incurred excessive wear in service. The construction of the diffuser case is such that the structure around the ignitor bosses is highly stressed. When the bosses are repaired by machining out the damaged area and welding in a repair insert, penetration of the weld in the boss would increase the stresses in the radius region at the bottom of the hole due to the residual stresses generated during the welding operation.

Limiting the penetration of the weld to less than the depth of the cavity machined out for the insert would permit a localized precipitation heat treatment of the weld, whereas a weld which had penetrated the full depth of the machined out cavity would require a full solution heat treatment of the entire diffuser case followed by precipitation heat treatment to restore the required mechanical properties. The full solution heat treatment would add considerable expense due to furnace operating requirements, removal of accessory hardware from the case, and removal of protective coatings, and would incur the risk of distortion of the diffuser case.

While it is desirable to limit the depth of penetration of the weld in this application, it is also necessary to insure a minimum depth of penetration in order to properly secure the repair insert in position. A nondestructive inspection method, which would verify adequate, but not excessive, weld penetration, is needed to insure the integrity of the repair operations.

Murakami, in Japanese Patent No. 58-179577, teaches that a minimum depth of penetration of a weld can be assured by detecting light or radioactive rays emitting from the weld zone and passing to the outside of the welded structure through a passage provided through the weld structure at a point near the deepest point of the required weld penetration. The positioning of a second passage and detection system is also disclosed to assure that allowable penetration has not been exceeded. This method requires either the existence or the creation of suitable pathways for the radiating signals to reach the detection system.

Leroux, in U.S. Pat. No. 4,893,944, teaches a nondestructive method of evaluating a joint made by hot pressure welding two metal parts at an elevated forging temperature. A tensile stress is applied perpendicularly to either side of the joint surface while the joint region is relatively hot, in order to enlarge any defects present in the joint surface. Such enlarged defects (if they exist) can be detected by means of x-rays, gamma rays, ultrasound or a like system. This system would apparently be applicable only where some degree of deformation of the welded system is allowable, and in which the weld interface is planar, so that a uniform tensile force can be applied normal to the weld interface.

Sayer, et al, in U.S. Pat. No. 3,436,515, disclose electron beam welding of workpieces arranged in a butting relationship wherein each workpiece is shaped with matching grooves which provide one or more recesses along the joint line so that the work pieces can be butt welded together by beams from opposite sides which penetrate only as far as the recesses. This prevents or reduces the risk of the weld formed by a beam on one side impinging on the weld formed by the beam from the other side. The grooves which limit the penetration of the weld beam appear to remain as grooves in the finished product.

DISCLOSURE OF INVENTION

What is needed is a method for nondestructively inspecting the weld joint where the depth of weld penetration is restricted.

The method of the present invention involves forming an inspection feature on the surface of a repair insert which is to be welded into the damaged area of the structure. The inspection feature is oriented such that, after the insert has been welded in place, a nondestructive inspection technique, such as x-ray or ultra-sound, can be used to determine the extent to which the inspection feature has been consumed by the welding process.

The inspection feature can exist in different forms, dependent on the nature of the inspection required. For instance, a cylindrical insert could have a groove formed at the minimum depth of the required weld, and another groove formed at the maximum permitted depth of the weld. The nondestructive inspection would then determine whether the first groove was entirely consumed, indicating that the weld penetration was sufficient, and whether any portion of the second groove was consumed, indicating whether the weld had penetrated excessively. An intermittent circumferential groove would also serve the same purpose.

Linear grooves parallel to the axis of the insert could be used, in which case the nondestructive inspection would provide a measurement of the actual depth of penetration of the weld. These, and other features and advantages of the invention, will be apparent from the description below, read in conjunction with the drawings.

BRIEF DESCRIPTION OF DRAWINGS

FIG. 1 is a perspective view in cross-section of an ignitor boss for a gas turbine engine diffuser case.

FIG. 2 is a perspective view in cross section of the ignitor boss in FIG. 1 after removal of the damaged material.

FIG. 3 is a perspective view of a repair insert with the inspection features, ready for insertion into the machined ignitor boss of FIG. 2.

BEST MODE FOR CARRYING OUT THE INVENTION

Figure 4:
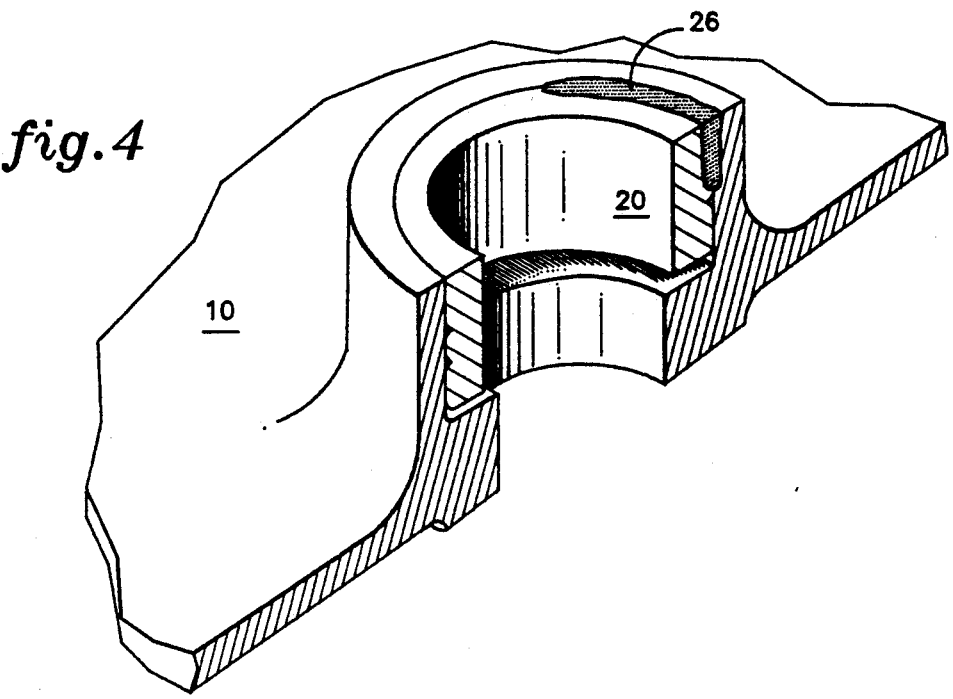
FIG. 4 is a perspective view in cross section of the ignitor boss showing the repair insert partially welded in position prior to machining of the threads.

The present invention process is best understood through consideration of the example represented in FIGS. 1 through 4, which illustrate the repair of a damaged ignitor boss in a gas turbine engine diffuser case. The ignitor boss 10 is shown in cross section in FIG. 1, where the threaded portion 12 provides a means for securing the ignitor (not shown) in position.

An ignitor boss on which the treads had been damaged was machined to remove the damaged material. As shown in FIG. 2, sufficient material was removed from the boss to remove the damaged portion and provide adequate space for the permanent installation of a repair insert which would replace the machined out material and permit remachining of the threads.

A repair insert 20, as shown in FIG. 3, was machined to fit the repair machined ignitor boss. According to this invention, the repair insert had inspection features formed into its surface. In this example, two circumferential grooves were machined, the first groove 22 being machined at the minimum acceptable depth of penetration of the weld, and the second groove 24 being machined at the maximum permissible depth of penetration of the weld.

For this particular repair, the repair insert 20 was machined approximately 0.001 inches larger than the diameter of the ignitor boss 10. The repair insert 20 was chilled with dry ice to decrease its diameter while the ignitor boss 10 was heated to approximately 600° F. to enlarge the diameter of the hole. The repair insert 20 was then positioned in the machined hole in the ignitor boss 10, and was secured in position by means of electron beam welding. Generally, electron beam or laser welding is used for a repair of this type, because the fused portion of the weld can be accurately located and contained within acceptable dimensions.

In this example, X-ray inspection of the weld zone indicated that the weld beam had successfully penetrated beyond the first inspection groove 22, but had not penetrated as far as the second inspection groove 24.

By way of explanation, as the repair insert 20 is welded in place, the weld beam penetrates to a distance along the interface which cannot be directly determined externally. The required depth of penetration is established as being more than the minimum distance required to sufficiently hold the insert in position, and less than the maximum distance beyond which, in this case, the weld stresses would encroach on a highly stressed region of the diffuser case. The inspection grooves are located to coincide with the minimum and maximum limitations of the weld penetration.

As shown in FIG. 4, the repair insert 20 is welded to a depth of penetration which is greater than the first inspection groove 22 but is less than the second inspection groove 24. In a properly welded joint, the first inspection groove 22 will be consumed as the weld 26 is formed, but the weld beam will not penetrate far enough to consume the second inspection groove 24.

In this example, an unfinished insert was used, since the welding operation would affect the accuracy of the threads, if they had been premachined. One of average skill in the art will appreciate that, in appropriate situations, a finish machined insert may be welded in place. The insert may also be solid, and may have other features, such as threaded studs, hoods, etc., which are external portions of the insert.

In a properly repaired diffuser case, a nondestructive inspection of the repaired ignitor boss 10 by, for example, x-ray inspection, will detect the uninterrupted presence of the unconsumed second inspection groove 24, but will not indicate any remaining signs of the first inspection groove 22. By this means it is determined that the weld beam has penetrated beyond the minimum required depth but has not penetrated as far as the maximum permitted depth.

If the nondestructive inspection reveals that any portion of the first inspection groove 22 has not been consumed, or that any portion of the second inspection groove 24 has been consumed, it would be determined that the weld zone 26 was not properly located to satisfy the requirements of the weld repaired structure.

Figure 5:
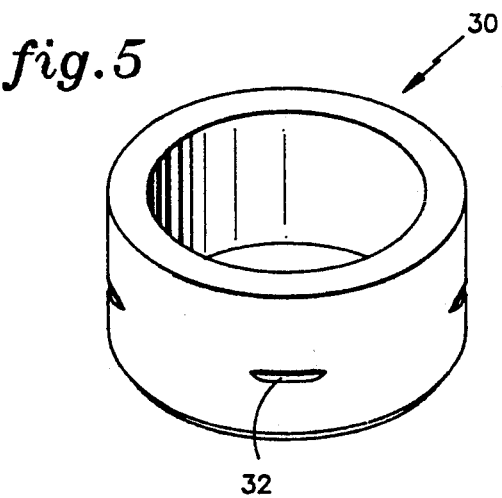
FIGS. 5 and 6 are perspective views of repair inserts showing alternate forms of the inspection feature.
Figure 6:
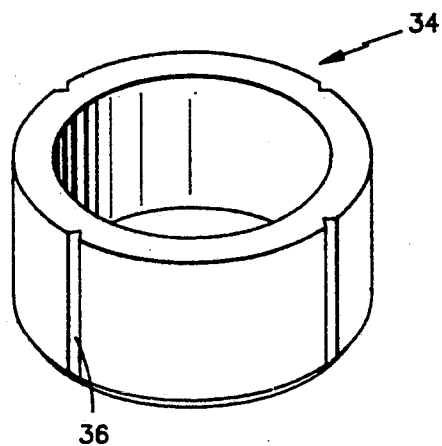

While this invention has been illustrated using an uninterrupted inspection groove, as shown in FIG. 3, a repair insert 30 having an interrupted circumferential groove 32, as shown in FIG. 5, could be used in place of the uninterrupted circumferential groove 22 shown in FIG. 3. Another variation of this technique involves an insert 34 having linear grooves 36 on the surface of the insert parallel to the axis of the insert, as shown in FIG. 6. Nondestructive inspection of a weld joint using this type of insert could be used to measure the actual depth of penetration of the weld rather than merely verifying that the weld lies between minimum and maximum limits.

While this invention has been shown in relation to the welding in place of a cylindrical repair insert, one of average skill in the art will understand that the principles of this invention are not restricted to this cylindrical configuration but may be applied to other welding operations as well. The technique may also be used in a manufacturing or repair operation using premachined or finished repair components, so that additional machining operations are not required after the welding has been completed, as long as the weld zone does not extend to the finish machined portions of the repair insert.

Although this invention has been shown and described with respect to detailed embodiments thereof, it will be understood by those skilled in the art that various changes, omissions and additions in form and detail thereof may be made without departing from the spirit and scope of the claimed invention.

We claim:

1. A method for inspecting a repair-welded structure wherein a repair insert is welded into a damaged hole, the improvement comprising:
   a. forming a first inspection groove on the insert at a distance equal to the minimum permissible penetration of the weld;

b. forming a second inspection groove on the insert at a distance equal to the maximum permissible penetration of the weld; and c. non-destructively inspecting the repaired structure to determine whether the weld has penetrated beyond the first inspection groove but not as far as the second inspection groove.

2. A method as recited in claim 1 wherein the welding is performed by a method selected from the group consisting of electron beam and laser welding.

3. A method for welding a repair insert into a hole comprising:

a. forming an inspection feature on the repair insert, with the inspection feature providing inspection capability extending from at least the minimum required weld depth to at least the maximum permitted weld depth;

b. inserting the repair insert into the hole;

c. welding the repair insert in the hole; and d. non-destructively inspecting the weld to determine whether the weld has penetrated beyond the minimum required depth but not as far as the maximum permitted depth.

4. A method as recited in claim 3 wherein the welding is performed by a method selected from the group consisting of electron beam and laser welding.

5. A method as recited in claim 3 wherein the inspection feature comprises at least one groove formed axially on the surface of the repair insert.

6. A method as recited in claim 5 wherein the inspection feature comprises a first circumferential groove formed in the insert at the minimum required depth of the weld and a second circumferential groove formed in the insert at the maximum permitted depth of the weld.

7. A method as recited in claim 3 wherein the inspection feature comprises a first segmented groove formed in the insert at the minimum required depth of the weld and a second segmented circumferential groove formed in the insert at the maximum permitted depth, with each segmented groove containing at least two segments.

8. A method for inspecting a repair insert welded into a hole comprising:

a. forming an inspection feature on the repair insert, with the inspection feature providing inspection capability extending from at least the minimum required weld depth to at least the maximum permitted weld depth;

b. inserting the repair insert into the hole;

c. welding the repair insert in the hole; and d. non-destructively inspecting the weld to determine whether the weld has penetrated beyond the minimum required depth but not as far as the maximum permitted depth.

9. A method as recited in claim 8 wherein the welding is performed by a method selected from the group consisting of electron beam and laser welding.

10. A method as recited in claim 8 wherein the inspection feature comprises at least one groove formed axially on the surface of the repair insert.

11. A method as recited in claim 10 wherein the inspection feature comprises a first circumferential groove formed in the insert at the minimum required depth of the weld and a second circumferential groove formed in the insert at the maximum permitted depth of the weld.

12. A method as recited in claim 8 wherein the inspection feature comprises a first segmented groove formed in the insert at the minimum required depth of the weld and a second segmented circumferential groove formed in the insert at the maximum permitted depth, with each segmented groove containing at least two segments.

* * * * *